(12) United States Patent
Burtscher

(10) Patent No.: US 7,346,611 B2
(45) Date of Patent: Mar. 18, 2008

(54) SYSTEM AND METHOD FOR ACCESSING DATA FROM A DATA STORAGE MEDIUM

(75) Inventor: Michael Burtscher, Longmont, CO (US)

(73) Assignee: Webroot Software, Inc., Boulder, CO (US)

( * ) Notice: Subject to any disclaimer, the term of this patent is extended or adjusted under 35 U.S.C. 154(b) by 335 days.

(21) Appl. No.: 11/104,201

(22) Filed: Apr. 12, 2005

(65) Prior Publication Data

US 2006/0230290 A1    Oct. 12, 2006

(51) Int. Cl.
G06F 7/10 (2006.01)
(52) U.S. Cl. .......................................................... 707/3
(58) Field of Classification Search ...................... 707/3
See application file for complete search history.

(56) References Cited

U.S. PATENT DOCUMENTS

| | | |
|---|---|---|
| 5,623,600 A | 4/1997 | Ji et al. |
| 6,069,628 A | 5/2000 | Farry et al. |
| 6,073,241 A | 6/2000 | Rosenberg et al. |
| 6,092,194 A | 7/2000 | Touboul |
| 6,154,844 A | 11/2000 | Touboul |
| 6,167,520 A | 12/2000 | Touboul |
| 6,310,630 B1 | 10/2001 | Kulkarni et al. |
| 6,397,264 B1 | 5/2002 | Stasnick et al. |
| 6,460,060 B1 | 10/2002 | Maddalozzo, Jr. et al. |
| 6,480,962 B1 | 11/2002 | Touboul |
| 6,535,931 B1 | 3/2003 | Celi, Jr. |
| 6,611,878 B2 | 8/2003 | De Armas et al. |
| 6,633,835 B1 | 10/2003 | Moran et al. |
| 6,667,751 B1 | 12/2003 | Wynn et al. |
| 6,701,441 B1 | 3/2004 | Balasubramaniam et al. |
| 6,785,732 B1 | 8/2004 | Bates et al. |
| 6,804,780 B1 | 10/2004 | Touboul |
| 6,813,711 B1 | 11/2004 | Dimenstein |
| 6,829,654 B1 | 12/2004 | Jungek |
| 6,965,968 B1 | 11/2005 | Touboul |
| 7,058,822 B2 | 6/2006 | Edery et al. |
| 2003/0217287 A1 | 11/2003 | Kruglenko |
| 2004/0030914 A1 | 2/2004 | Kelley et al. |
| 2004/0034794 A1 | 2/2004 | Mayer et al. |

(Continued)

OTHER PUBLICATIONS

Codeguru, Three Ways to Inject Your Code Into Another Process, by Robert Kuster, Aug. 4, 2003, 22 pgs.

(Continued)

*Primary Examiner*—Chong H Kim
(74) *Attorney, Agent, or Firm*—Cooley Godward Kronish LLP

(57) ABSTRACT

Systems and methods for managing multiple related pestware processes on a protected computer are described. One embodiment is configured to identify a location of each of a plurality of files in at least one file storage device of the protected computer and store a list of the location of each of the plurality of files. The list of the plurality of files is then sorted so as to generate a sorted list. Each of the plurality of files is then sequentially accessed as listed in the sorted list so as to retrieve information from each of the plurality of files. Information from the plurality of files is then analyzed to determine whether any of the plurality of files are potential pestware files. In variations, the files in the file storage device are enumerated, and information from the files is accessed, by circumventing the operating system of the protected computer.

19 Claims, 3 Drawing Sheets

U.S. PATENT DOCUMENTS

| | | |
|---|---|---|
| 2004/0064736 A1 | 4/2004 | Obrecht et al. |
| 2004/0080529 A1 | 4/2004 | Wojcik |
| 2004/0143763 A1 | 7/2004 | Radatti |
| 2004/0187023 A1 | 9/2004 | Alagna et al. |
| 2004/0225877 A1 | 11/2004 | Huang |
| 2005/0138433 A1 | 6/2005 | Linetsky |
| 2006/0085528 A1* | 4/2006 | Thomas ...................... 709/223 |

OTHER PUBLICATIONS

Codeguru, Managing Low-Level Keyboard Hooks With The Windows API for VB .Net, by Paul Kimmel, Apr. 18, 2004, 10 pgs.

Codeguru, Hooking The Keyboard, by Anoop Thomas, Dec. 13, 2001, 6 pgs.

Illusive Security, Wolves In Sheep's Clothing: malicious DLLs Injected Into trusted Host Applications, Author Unknown, http://home.arcor.de/scheinsicherheit/dll.htm 13 pgs.

DevX.com, Intercepting Systems API Calls, by Seung-Woo Kim, May 13, 2004, 6 pgs.

Microsoft.com, How To Subclass A Window in Windows 95, Article ID 125680, Jul. 11, 2005, 2 pgs.

MSDN, by Kyle Marsh, Jul. 29, 1993, 15 pgs.

PCT Search Report, PCT/US05/34874, Jul. 5, 2006, 7 Pages.

* cited by examiner

SYSTEM AND METHOD FOR ACCESSING DATA FROM A DATA STORAGE MEDIUM

RELATED APPLICATIONS

The present application is related to the following commonly owned and assigned applications: application Ser. No. 10/956,578, entitled *System and Method for Monitoring Network Communications for Pestware*; application Ser. No. 10/956,573, entitled *System and Method For Heuristic Analysis to Identify Pestware*, application Ser. No. 10/956,574, entitled *System and Method for Pestware Detection and Removal*, and application Ser. No. 11/104,202, filed herewith, entitled *System and Method for Directly Accessing Data From a Data Storage Medium* each of which is incorporated by reference in their entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actual beneficial or wanted by the user. Wanted pestware is sometimes not characterized as "pestware" or "spyware." But, unless specified otherwise, "pestware" as used herein refers to any program that collects and/or reports information about a person or an organization and any "watcher processes" related to the pestware.

Software is available to detect pestware, but scanning a system for pestware typically requires a system to look at files stored in a data storage device (e.g., disk) on a file by file basis. This process of scanning files is frequently time consuming, and as a consequence, users must wait a substantial amount of time to find out the results of a system scan. Even worse, some users elect not to perform a system scan because they do not want to, or cannot, wait for a scan to be completed. Accordingly, current software is not always able to scan and remove pestware in a convenient manner and will most certainly not be satisfactory in the future.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention include methods for scanning files of a protected computer for pestware. One embodiment is configured to identify a location of each of a plurality of files in at least one file storage device of the protected computer and store a list of the location of each of the plurality of files. The list of the plurality of files is then sorted by the location of each of the plurality of files so as to generate a sorted list of files. The files are then accessed in accordance with their position in the sorted list of files so as to retrieve information from each of the plurality of files in an order determined by the location of the files in the file storage device. The retrieved information from each of the plurality of files is then analyzed so as to determine whether any of the plurality of files are potential pestware files.

In another embodiment the invention may be characterized as a system for managing pestware. In this embodiment, a pestware detection module is configured to detect pestware on a protected computer, which includes a file storage device and a program memory. The system also includes a sweep speedup module configured to identify a location of each of a first file, a second file and a third file in the file storage device of the protected computer, and retrieve information from each of the first file, the second file and the third file in an order determined by the respective locations of the first file, the second file and the third file in the file storage device. The pestware detection module in this emboidiment is configured to analyze the retrieved information from each of the first file, the second file and the third file so as to determine whether each of the first file, the second file and the third file is a potential pestware file. These and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

According to several embodiments, the present invention decreases the amount of time required to retrieve information from files stored in a computer system's storage device (e.g., hard drive).

In prior art computer systems, when a file is accessed (e.g., to retrieve information from the files), the computer's operating system is typically utilized to access the file. The operating system, however, typically performs several logistical operations before and/or while accessing a particular file. For example, before a typical operating system accesses a file, the operating system checks to make sure that accessing the file does not violate any established security provisions. In addition, the operating system must make sure the file is not already in use, and if it is, the operating system typically denies access to the file. And once the operating system does access a file, it flags the file so that it cannot be subsequently accessed while it is in use.

Although these logistical operations may be unnoticeable when just a few files are accessed, when several files are accessed, the logistical operations, in aggregate, take a substantial amount of time to carry out, and as a consequence, become very noticeable to the user.

In addition, when a user desires to perform a general scan of a collection of files (e.g., for pestware), prior art scanning software typically utilizes the operating system to enumerate (i.e., identify) each file in the collection of files to be scanned. Once the files are enumerated, the prior art scanning software then accesses, utilizing the operating system, each enumerated file, file by file, in the order the files are enumerated by the operating system.

Unfortunately, the order in which typical operating systems enumerate files may be determined by the directory tree that the files are organized by instead of the physical location of the files in the computer system's file storage device. In the context of a disk drive for example, the order in which files are enumerated may have very little, if any, relation to the location of the files on the disk. As a consequence, the head of a disk dive may have to move across opposite ends of the disk surface to access two files that were juxtaposed in the list of files enumerated by the operating system.

Although the time it takes the head to jump between two disparate locations on a disk surface to access two enumerated files may be insignificant, when several enumerated files (e.g., several hundred or thousand files) are accessed, the amount of time required for the disk heads to traverse the disk surface, in aggregate, is substantial.

Figure 1:
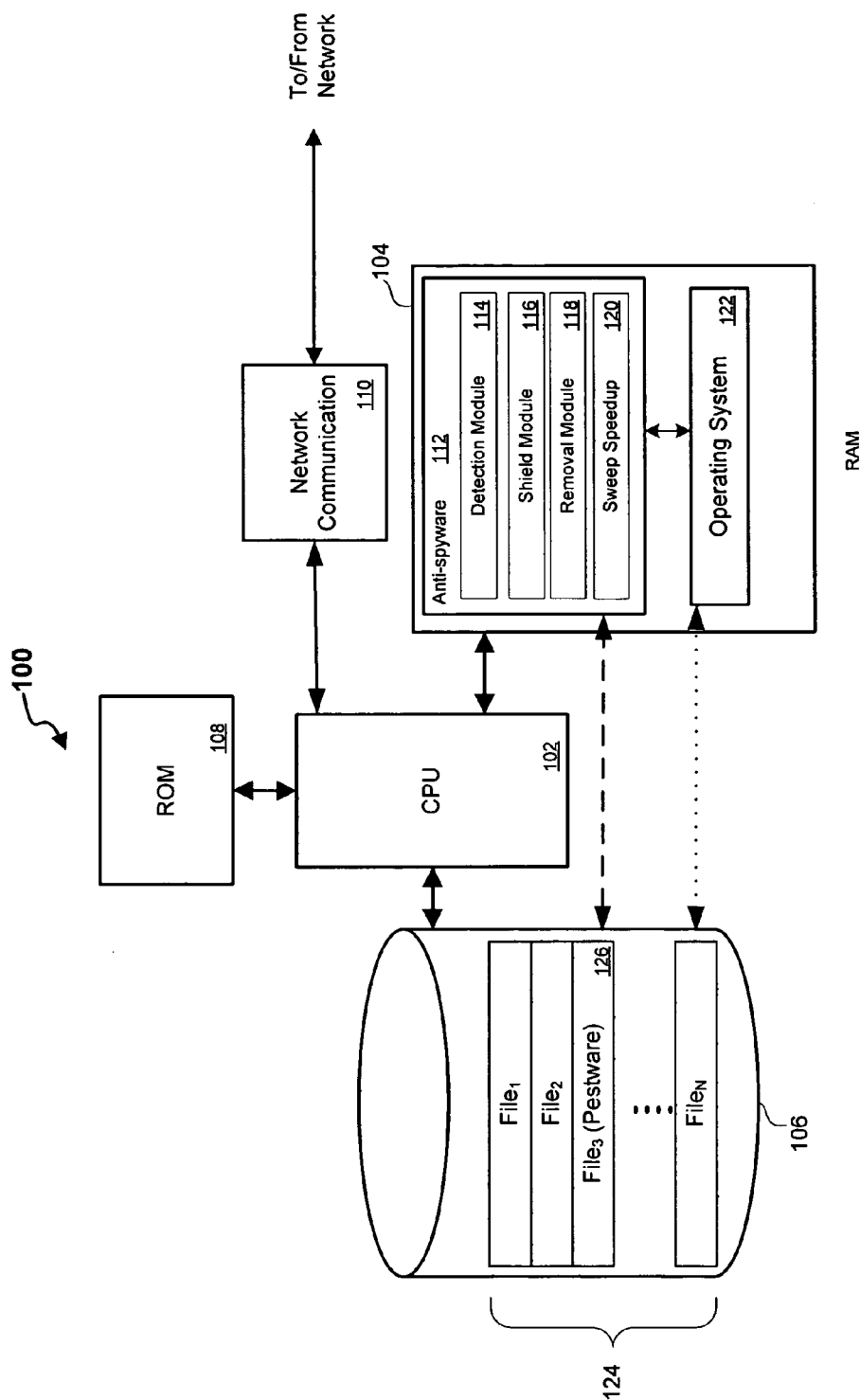
FIG. 1 illustrates a block diagram of a protected computer in accordance with one implementation of the present invention.

Referring first to FIG. 1, shown is a block diagram 100 of a protected computer/system in accordance with one implementation of the present invention. The term "protected computer" is used herein to refer to any type of computer system, including personal computers, handheld computers, servers, firewalls, etc. This implementation includes a CPU 102 coupled to memory 104 (e.g., random access memory (RAM)), a file storage device 106, ROM 108 and network communication 110.

As shown, the storage device 106 provides storage for a collection of N files 124, which includes a pestware file 126. The storage device 106 is described herein in several implementations as hard disk drive for convenience, but this is certainly not required, and one of ordinary skill in the art will recognize that other storage media may be utilized without departing from the scope of the present invention. In addition, one of ordinary skill in the art will recognize that the storage device 106, which is depicted for convenience as a single storage device, may be realized by multiple (e.g., distributed) storage devices.

As shown, an anti-spyware application 112 includes a detection module 114, a shield module 116, a removal module 118 and a sweep speedup module 120, which are implemented in software and are executed from the memory 104 by the CPU 102. In addition, an operating system 122 is also depicted as running from memory 104.

The software 112 can be configured to operate on personal computers (e.g., handheld, notebook or desktop), servers or any device capable of processing instructions embodied in executable code. Moreover, one of ordinary skill in the art will recognize that alternative embodiments, which implement one or more components (e.g., the anti-spyware 112) in hardware, are well within the scope of the present invention.

In the present embodiment, the operating system 122 is not limited to any particular type of operating system and may be operating systems provided by Microsoft Corp. under the trade name WINDOWS (e.g., WINDOWS 2000, WINDOWS XP, and WINDOWS NT). Additionally, the operating system may be an open source operating system such operating systems distributed under the LINUX trade name. For convenience, however, embodiments of the present invention are generally described herein with relation to WINDOWS-based systems. Those of skill in the art can easily adapt these implementations for other types of operating systems or computer systems.

In accordance with some embodiments of the present invention, the sweep speedup module 120 expedites the scanning of the N files 124 for pestware (e.g., the pestware file 126) in the data storage device 106 by scanning the files 124 according to their physical location in the data storage device 106 instead of the order the files are enumerated by the operating system. In this way, the time required for the mechanism(s) within the file storage device (e.g., a disk head) to access each file is substantially reduced.

Figure 3:
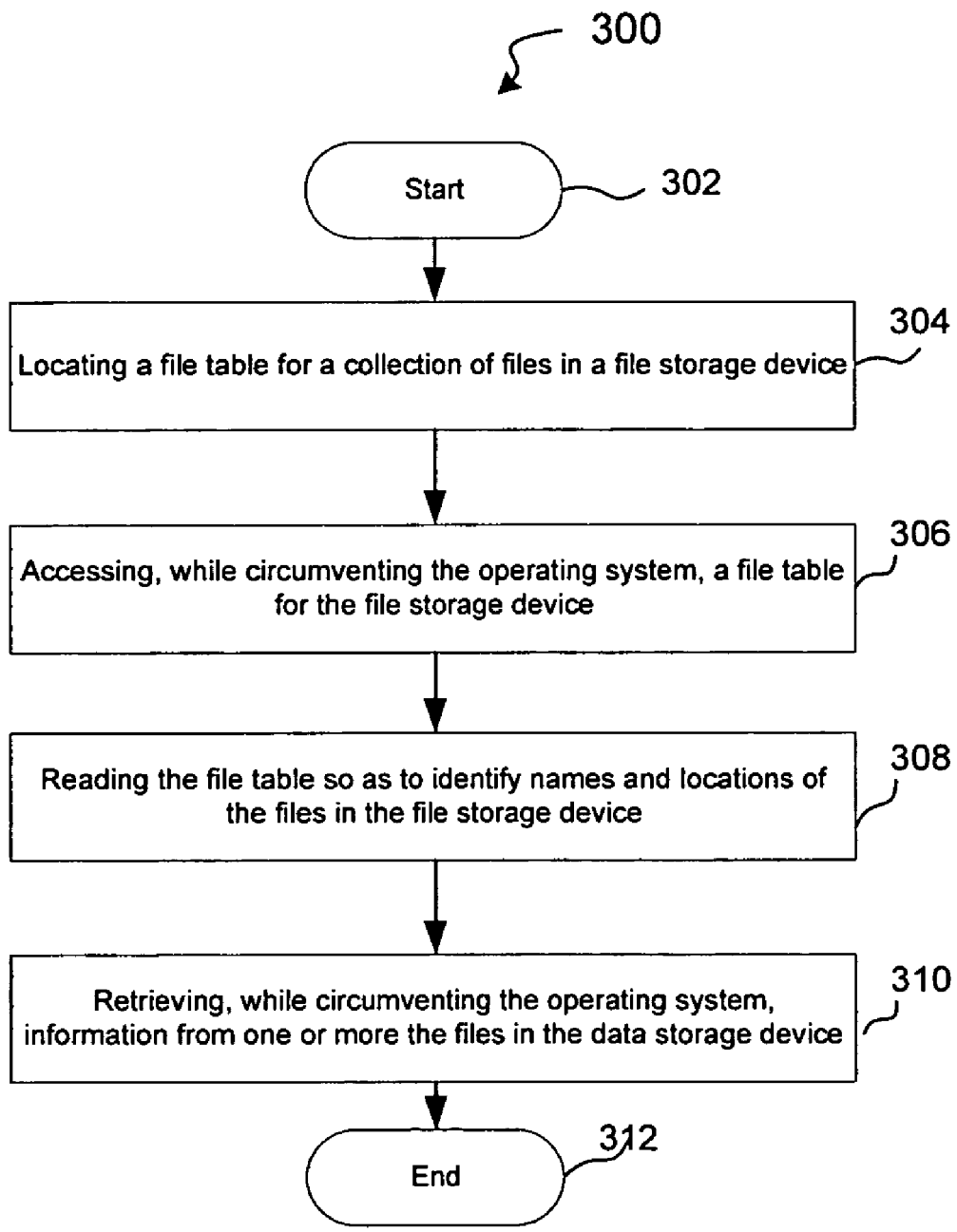
FIG. 3 is a flowchart of a method for enumerating and accessing information from the plurality of files while circumventing the operating system of the protected computer in accordance with another embodiment of the present invention.

In other embodiments, as discussed further with reference to FIG. 3, the sweep speedup module 120 expedites the scanning of the N files 124 for pestware (e.g., the pestware file 126) in the data storage device 106 by circumventing the operating system 122 and directly accessing the files in the data storage device.

In yet other embodiments, the sweep speedup module 120 both directly accesses the data storage device 106 to locate and identify files in the data storage device 120 and accesses the files according to their location in the data storage device so as to further expedite the scanning of the N files 124 for any pestware.

Figure 2:
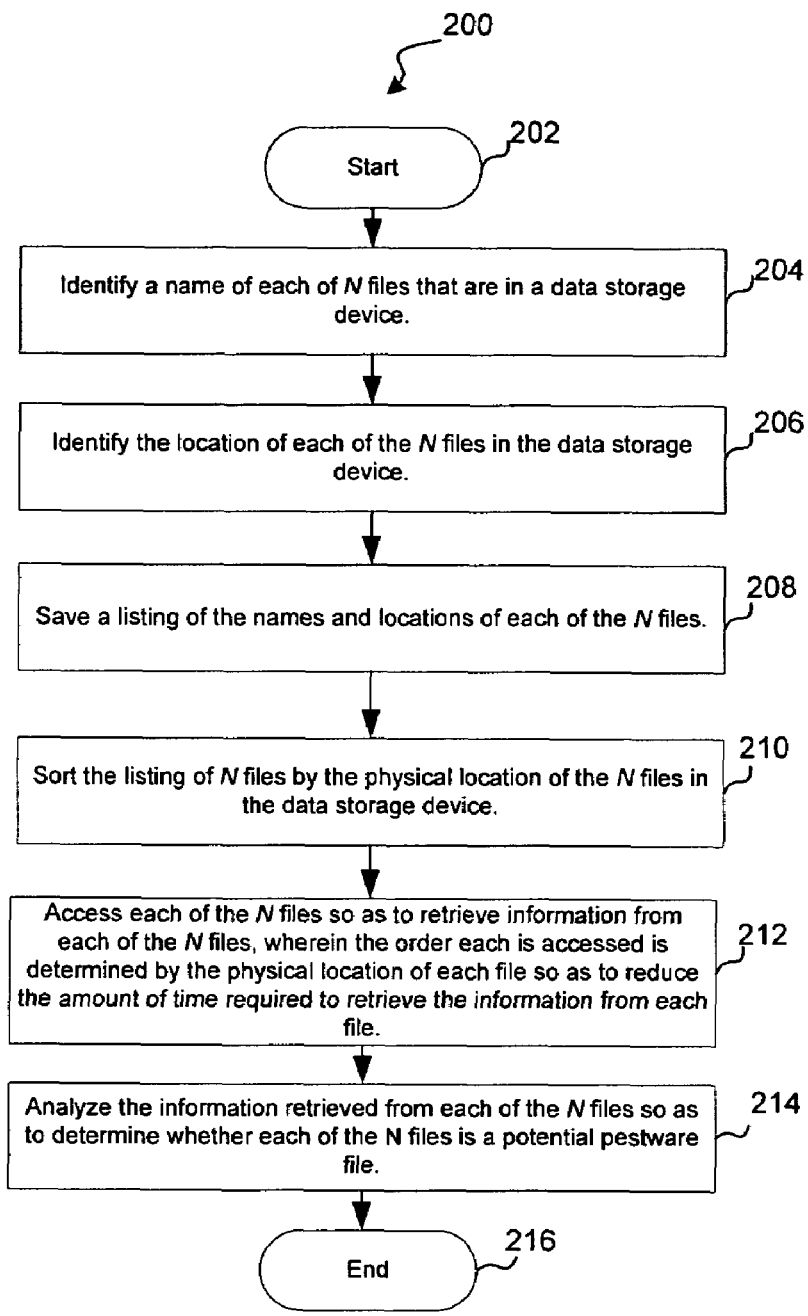
FIG. 2 is a flowchart of one method for accessing information from a plurality of files in accordance with an embodiment of the present invention.

Referring next to FIG. 2, shown is a flowchart depicting steps traversed in accordance with a method for accessing files in the data storage device 106 according to the files physical location. Initially, the name of each of the N files 124 that are in the data storage device 106 are identified (Blocks 202, 204). In addition, the location of each of the N files within the data storage device 106 is also identified (Block 206). In some embodiments, the operating system 122 is utilized to both enumerate and identify the locations of the N files 124. In other embodiments, however, the names and locations of the N files 124 are identified by directly accessing the data storage device as discussed further herein with reference to FIG. 3.

As shown, a listing of the names and locations of the N files 124 is then saved (Block 208), and the stored listing of the N files 124 is sorted by the physical location of the N files 124 (Block 210). In the case where the physical storage device 106 is a disk drive, for example, the N files 124 are sorted by the cluster numbers of the files.

After the N files 124 are sorted so as to generated a sorted listing of the N files 124, information is retrieved from each of the N files 124, file-by-file, in accordance with the sorted listing (Block 212). For example, information may be retrieved from the N files 124 by accessing them in a sequential manner starting at either the top or the bottom of the sorted list. In this way, each file that is accessed is in close proximity to the file previously accessed. As a consequence, the time required to retrieve information from the N files 124 is substantially reduced relative to accessing the N files 124 in accordance with the location of the N files 124 in the directory tree. After information is retrieved from each of the N files 124, the information is analyzed to determine whether each file is potentially a pestware file, and the scanning processes is ended after information from each of the N files 124 is analyzed (Blocks 214 and 216). It should be recognized, that the information received from each file may be analyzed (Block 214) while information from other files is being retrieved (Block 212) so as to expedite the entire process of retrieving and analyzing information from the N files 124.

In several embodiments, the detection module 114, it is responsible for detecting pestware or pestware activity on the protected computer 100 based upon the information received from the N files 124. In one embodiment for example, the detection module compares a representation of known pestware files (e.g., a cyclical redundancy code (CRC) of a portion of the pestware file) with a representation (e.g., CRC) of a portion of each of the N files 124. In one variation, only 500 Bytes of information are retrieved from each of the N files 124 and a CRC of the 500 Bytes of information retrieved from each file is compared with the known pestware definitions. If the 500 Bytes of retrieved information indicates the file is a potential pestware file, then a more thorough analysis (e.g., an analysis of the entire file) is conducted. In this way, the comparison of each file with definitions of pestware files is expedited.

Pestware and pestware activity can also be detected by the shield module 116, which generally runs in the background on the computer system. Shields can generally be divided into two categories: those that use definitions to identify known pestware and those that look for behavior common to pestware. This combination of shield types acts to prevent known pestware and unknown pestware from running or being installed on a protected computer.

In many cases, the detection and shield modules (114 and 116) detect pestware by matching files on the protected computer with definitions of pestware, which are collected from a variety of sources. For example, a host computers, protected computers and other systems can crawl the Web to actively identify pestware. These systems often download programs and search for exploits. The operation of these exploits can then be monitored and used to create pestware definitions. Various techniques for detecting pestware are disclosed in the above-identified and related application entitled: System and Method for Monitoring Network Communications for Pestware.

Referring next to FIG. 3, shown is a flowchart 300 depicting steps carried out by the sweep speedup module 120 when directly accessing information from the file storage device 106 of FIG. 1 in accordance with several embodiments of the present invention. As shown, initially a file table (e.g., a master file table (MFT)) that is associated with a collection of the N files 124 in the files storage device 106 is located (Blocks 302 and 304). In one embodiment, the operating system is initially utilized to help locate the file table. For example, if the file storage device 106 is a hard drive that has been partitioned into two or more drives, the operating system is utilized to identify the partitioned drives.

After the file table for a collection of the N files 124 is located, the file table is accessed, while circumventing the operating system (Block 306), and the file table is read so as to identify names, locations and other attributes of the files (e.g., file size, compression flags and encryption flags) of the collection of the N files 124 in the file storage device 106 (Block 308). In some embodiments, the entire file structure of the collection of the N files 124 built and stored so that the location of every one of the N files 124 is known. Thus, the steps identified in Blocks 304, 306 and 308 may be utilized to generate the listing of names and locations, discussed with reference to Block 208 of FIG. 2, by directly accessing the file storage device 106.

After the names and locations of the N files 124 are identified (Block 308), information from each of the N files 124 is retrieved, while circumventing the operating system, until each of the N files 124 has been accessed (Blocks 310 and 312). This information may be utilized, as previously discussed, to identify pestware (e.g., the pestware 126) among the N files 124 (Block 214).

It should be recognized that the processes depicted in FIGS. 2 and 3 are shown in separate drawings merely to show that each process may be implemented separately to achieve substantial decreases in the amount of time that is required to scan files. In accordance with some embodiments, the processes depicted in FIGS. 2 and 3 may be combined so as to achieve even faster file scans. Specifically, the direct access techniques discussed with reference to FIG. 3 may be utilized to enumerate the N files 124 as depicted in Blocks 204 and 206. Moreover, after the listing of the N files 124 is sorted (Block 210), the files may be directly accessed at block 212, by circumventing the operating system 122.

In conclusion, the present invention provides, among other things, a system and method for managing pestware. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for scanning files on a protected computer for pestware comprising:

identifying a location of each of at least a first file, a second file and a third file in at least one file storage device of the protected computer;

retrieving information from the first file;

analyzing the information from the first file to determine whether the first file is a potential pestware file;

accessing, after retrieving the information from the first file, the second file before accessing the third file in response to the time required to access the second file being less than the time required to access the third file;

retrieving information from the second file;

analyzing the information from the second file to determine whether the second file is a potential pestware file; and reporting results of the analyzing the information from the first and second files to a user.

2. The method of claim 1 further comprising:

sorting, by location, the first file, the second file and the third file so as to generate a sorted list of files.

3. The method of claim 2 wherein the at least one file storage device is a disk drive, and wherein the sorting, by location, is sorting by the cluster numbers of the first file, the second file and the third file.

4. The method of claim 3 wherein the accessing the second file before accessing the third file is in response the second file having a cluster number that is closer to the first file than the third file.

5. The method of claim 1 wherein the identifying includes utilizing an operating system of the protected computer to identify the location of each of at least the first file, the second file and the third file.

6. The method of claim 1 wherein the identifying includes circumventing the operating system of the protected computer while identifying the location of each of at least the first file, the second file and the third file.

7. A system for managing pestware comprising:
at least one processor:
a memory containing a plurality of program instructions, the plurality of program instructions including:
a pestware detection module configured to cause the at least one processor to detect pestware on a protected computer, the protected computer including at least one file storage device; and
a sweep speedup module configured to cause the at least one processor to:
identify a location of each of a first file, a second file, and a third file in the at least one file storage device of the protected computer; and
retrieve information from each of the first file, the second file, and the third file in an order determined by the respective locations of the first file, the second file, and the third file in the file storage device;
wherein the pestware detection module is configured to cause the at least one processor to analyze the retrieved information from each of the first file, the second file, and the third file so as to determine whether each of the first file, the second file, and the third file is a potential pestware file and to report results of that analysis to a user.

8. The system of claim 7 wherein the sweep speedup module is configured to cause the at least one processor to sort, by location, the first file, the second file and the third file so as to generate a sorted list of files.

9. The system of claim 8 wherein the sweep speedup module is configured to cause the at least one processor to sequentially retrieve the first, the second and the third files in an order the first, the second and the third files appear in the sorted list of files.

10. The system of claim 8 wherein the at least one file storage device is a disk drive, and wherein the sweep speedup module is configured to cause the at least one processor to sort the first file, the second file and the third file by the cluster numbers of the first file, the second file and the third file so as to generate the sorted list of files.

11. The system of claim 10 wherein the sweep speedup module is configured to cause the at least one processor to sequentially retrieve the first, the second and the third files in an order the first, the second and the third files appear in the sorted list of files.

12. The method of claim 7 wherein the sweep speedup module is configured to cause the at least one processor to identify each of the first, the second and the third files by utilizing an operating system of the protected computer to identify the location of each of at least the first file, the second file and the third file.

13. The method of claim 7 wherein the sweep speedup module is configured to cause the at least one processor to identify each of the first, the second and the third files by circumventing the operating system of the protected computer while identifying the location of each of at least the first file, the second file and the third file.

14. A method for scanning files on a protected computer for pestware comprising:
identifying a location of each of a plurality of files in at least one file storage device of the protected computer;
storing a list of the location of each of the plurality of files;
sorting the list of the plurality of files so as to generate a sorted list;
accessing, sequentially, each of the plurality of files as listed in the sorted list so as to retrieve information from each of the plurality of files;
analyzing the information from each of the plurality of files so as to determine whether any of the plurality of files are potential pestware files; and
reporting to a user results of the analyzing the information from each of the plurality of files.

15. The method of claim 14 wherein the identifying includes utilizing an operating system of the protected computer to identify the location of each of the plurality of files.

16. The method of claim 14 wherein the identifying includes circumventing the operating system of the protected computer while identifying the location of each of the plurality of files.

17. The method of claim 14 wherein the identifying the location of each of a plurality of files includes identifying a cluster number of each of the plurality of files in a disk drive of the protected computer.

18. The method of claim 14 wherein the accessing includes accessing an operating system of the protected computer to access each of the plurality of files.

19. The method of claim 14 wherein the accessing includes circumventing an operating system of the protected computer while accessing each of the plurality of files.

* * * * *